United States Patent

Kang et al.

[11] Patent Number: 5,608,589
[45] Date of Patent: Mar. 4, 1997

[54] TAPE RUNNING SYSTEM FOR MAGNETIC RECORDING AND REPRODUCING APPARATUS

[75] Inventors: Myung G. Kang, Seoul; Seong S. Kang; Sung H. Choi, both of Kyungki-Do; Mun C. Joung, Seoul; Byoung G. Jang, Kyungki-Do; Kye Y. Ryu, Seoul; Hyo C. Yu, Seoul; Sang J. Lee, Kyungki-Do, all of Rep. of Korea

[73] Assignee: Goldstar Co., Ltd., Seoul, Rep. of Korea

[21] Appl. No.: 424,570

[22] Filed: Apr. 17, 1995

Related U.S. Application Data

[63] Continuation of Ser. No. 75,322, Jun. 11, 1993, abandoned.

[30] Foreign Application Priority Data

Jun. 17, 1992 [KR] Rep. of Korea ............... 10707/1992
Jun. 17, 1992 [KR] Rep. of Korea ............... 10710/1992
Jun. 17, 1992 [KR] Rep. of Korea ............... 10713/1992

[51] Int. Cl.$^6$ .......................... G11B 5/027; G11B 15/61
[52] U.S. Cl. ......................................... 360/85; 360/95
[58] Field of Search ................... 360/85, 95, 95.6, 360/96.6

[56] References Cited

U.S. PATENT DOCUMENTS

| | | | |
|---|---|---|---|
| 4,752,845 | 6/1988 | Suzuki | 360/95 |
| 4,868,693 | 9/1989 | Tsutsumi et al. | 360/85 |
| 4,951,164 | 8/1990 | Yasaka et al. | 360/85 |
| 5,034,830 | 7/1991 | Lee | 360/85 |
| 5,315,460 | 5/1994 | Takeda et al. | 360/85 |

FOREIGN PATENT DOCUMENTS

| | | | |
|---|---|---|---|
| 61-11961 | 1/1986 | Japan | 360/85 |
| 63-56851 | 3/1988 | Japan | 360/96.5 |
| 63-220447 | 9/1988 | Japan | 360/96.5 |
| 2-226538 | 9/1990 | Japan | 360/96.5 |
| 4-114350 | 4/1992 | Japan | 360/96.5 |
| 4-114351 | 4/1992 | Japan | 360/95 |

*Primary Examiner*—Robert S. Tupper
*Assistant Examiner*—William J. Klimowicz

[57] ABSTRACT

A tape running system for a slide loading type magnetic recording and reproducing apparatus. The system comprises a stationary base plate mounted on a deck mechanism of the apparatus, a slide base mounted on the stationary base plate such that it is reciprocated with respect to the stationary base plate within a predetermined range, a pair of loading gears mounted on the lower surface of the stationary base plate and engaging with each other and connected to a pair of slant post assemblies through individual loading levers, and a rotational force transmitting unit transmitting the rotational force of the loading gears to the slide base for driving the slide base. The rotational force transmitting unit is connected between one of the pair of loading gears and the slide base and linearly reciprocates the slide base using the rotational force of the loading gears. The pair of slant post assemblies as well as the slide base are driven by the rotational force of the loading gears, thereby achieving the recent trend of compactness and light weight design.

8 Claims, 12 Drawing Sheets

TAPE RUNNING SYSTEM FOR MAGNETIC RECORDING AND REPRODUCING APPARATUS

This application is continuation of application Ser. No. 08/075,322 filed on Jun. 11, 1993, now abandoned.

BACKGROUND OF THE INVENTION

1. Field of the Invention

The present invention relates in general to a deck mechanism of a magnetic recording and reproducing apparatus, such as a slide loading type camera recorder, and more particularly to a tape running system for such a deck mechanism of the magnetic recording and reproducing apparatus.

2. Description of the Prior Art

Conventionally, a slide loading type camera recorder, so to speak a slide loading type camcorder, comprises a slide base which is mounted on a stationary base plate such that it reciprocates frontwards and backwards. A rotary head drum is slantingly mounted on the stationary base plate while both a supply reel table and a take-up reel table are mounted on the slide base. The conventional slide loading type camcorder further includes an operable cassette housing hinged to a side of the stationary base plate by means of a hinge shaft. In order to load a tape cassette in the deck mechanism of the camcorder, the tape cassette is inserted into the cassette housing in an eject position and turned downwards about the hinge shaft along with the cassette housing. At this state, the slide base moves backwards, that is, in the direction toward the rotary head drum, thereby achieving the loaded state of the cassette tape.

In the above slide loading type camcorder, a loading lever mechanism comprising a plurality of link levers is operated in cooperation with a pair of loading gears, mounted on the stationary base plate such that they engage with each other. Hence, the loading lever mechanism moves a slant post assembly to its play mode position. At this time, the slide base is moved to its play mode position by an auxiliary drive power transmission unit.

As described above, the conventional slide loading type camcorder should drive the slant post assembly and the slide base employing individual drive units, thereby increasing in the number of required elements, resulting in increase of manufacturing cost. In addition, the requirement of varieties of elements complicates the construction of the camcorder and prohibits the achievement of the recent trend toward compactness and lightweight designs.

On the other hand, in the case of a conventional portable video cassette recorder (VCR) of the VHS type which is more generalized than the aforementioned portable camcorder, it is well noted that the designing condition for the rotary head drum and the slant post, both elements being regarded as kernel elements of the tape running system of the VCR, have a large effect upon the tape running performance of the VCR. Otherwise stated, the designing condition, such as a slant direction and a slant angle of the rotary head drum, a lapping angle of the tape with respect to the rotary head drum and a lapping angle of the tape with respect to the slant post has a large effect upon the tape running performance of the VCR of the VHS type. In this regard, the above designing condition has been regarded as an important factor in the determination of the tape recording and playback performance of the VCR.

However, in the case of the conventional slide loading type camcorder, there is a problem in that the above designing condition for the rotary head drum and the slant post is not suitable for shortening of the Y-directional length of the result camcorder as well as for reduction of the tape running load.

Moreover, as is well known to those skilled in the art, the conventional camcorder is provided with an automatic tension control unit for automatically controlling the tensile force of the tape. Thus, the tensile force of the tape, otherwise stated, the tensile force imparted to the tape in a tape running mode, such as a playback mode, is intended to be constantly maintained at, a predetermined level. However, in the conventional camcorder, the tensile force imparted to the tape in both the playback mode and a stop mode is fixed, so that there is a problem in that the rotary head drum is not smoothly operated due to the tensile force of the tape when the rotary head drum, stopped in the stop mode, starts to be rotated in the playback mode. The above problem becomes worse in the case of a dewed state of the inside of the camcorder even when the dew level of the inside of the camcorder is relatively low such that it is not detected by a dew sensor.

In order to overcome the above problem caused by the tensile force of the tape, there has been proposed a device for smoothly starting the rotary head drum by making the tensile force of the tape in the stop mode be maintained at a predetermined level lower than that in the playback mode. However, a problem of this device is resided in that it should include a complicated turning mechanism for turning a tension arm having a tension post and which inefficiently consumes a large quantity of driving power for driving the complicate turning mechanism.

SUMMARY OF THE INVENTION

It is, therefore, an object of the present invention to provide a tape running system for a magnetic recording and reproducing apparatus in which the aforementioned problems can be overcome and which includes slide base and slant post drive means comprising a pair of loading gears, connected to a pair of slant post assemblies through individual loading levers, and a slide base driving power transmission unit, connected between one of the pair of loading gears and the slide base and linearly reciprocating the slide base using the rotational force of the loading gears, thereby driving the pair of slant post assemblies as well as the slide base using the same rotational force of the loading gears.

It is another object of the present invention to provide an optimal designing condition used in installation of the rotary head drum and the slant post and suitable for achieving the recent trend of compactness of the magnetic recording and reproducing apparatus and reducing the tape running load.

It is a further object of the present invention to provide an optimal designing condition suitable for searching, in a high speed searching mode, an index code provided at the front of a video signal recording section of the magnetic recording tape.

It is yet another object of the present invention to provide a tape running system which includes a tension control unit having a simple construction and comprising a drive cam provided on a power transmission gear to transmit the rotational force of a loading motor to a pair of loading gears, and an operating pin provided at a tension arm to cooperate with the drive cam, thereby causing the tension arm in the change of the mode from the playback mode into the stop mode to be rotated by the drive cam as well as the drive pin at a predetermined rotating angle, and reducing the tensile force of the tape.

To accomplish the above objects, a tape running system for a magnetic recording and reproducing apparatus according to an embodiment of the present invention comprises: a stationary base plate mounted on a main body of the apparatus, a slide base mounted on the stationary base plate such that it is reciprocated with respect to the stationary base plate within a predetermined range, a pair of loading gears mounted on the lower surface of the stationary base plate and engaging with each other and connected to a pair of slant post assemblies through individual loading levers, and means for transmitting the rotational force of the loading gears to the slide base for driving the slide base, the rotational force transmitting means being connected between one of the pair of loading gears and the slide base and linearly reciprocating the slide base using the rotational force of the loading gears, whereby the pair of slant post assemblies as well as the slide base are driven by the rotational force of the loading gears.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which:

FIGS. 1 to 8 show a construction and operations of a tape running system for a magnetic recording and reproducing apparatus in accordance with an embodiment of the present invention, in which:

FIGS. 1 and 2 are side views of a deck mechanism having the tape running system in the eject mode position and in the loading end position, respectively;

FIGS. 3 to 5 are plan views of the deck mechanism having the tape running system in the eject mode position, in the loading progress position and in the loading end position, respectively; and FIG. 6 is a plan view of the deck mechanism, and showing an auxiliary control cam adapted for controlling a fixed position of a slide base in accordance with another embodiment of the present invention and mounted on the slide base such that its mounting position is adjustable;

FIG. 7 is a partial enlarged plan view of a part of the deck mechanism including a rotary head drum;

FIG. 8 is a schematic plan view of the rotary head drum and showing an inclination direction of the rotary head drum;

DESCRIPTION OF THE PREFERRED EMBODIMENTS

With reference to FIGS. 1 to 6, FIGS. 1 and 2 are side views of a deck mechanism having a tape running system in accordance with the present invention in an eject position and in a loading end position, respectively, FIGS. 3 to 6 are plan views showing the construction and operations of the deck mechanism, respectively. As shown in FIGS. 1 to 4, a slide base 2 is mounted on a stationary base plate 1 such that it is reciprocated within a predetermined distance range in a direction shown at the arrow of FIG. 1.

Figure 3:
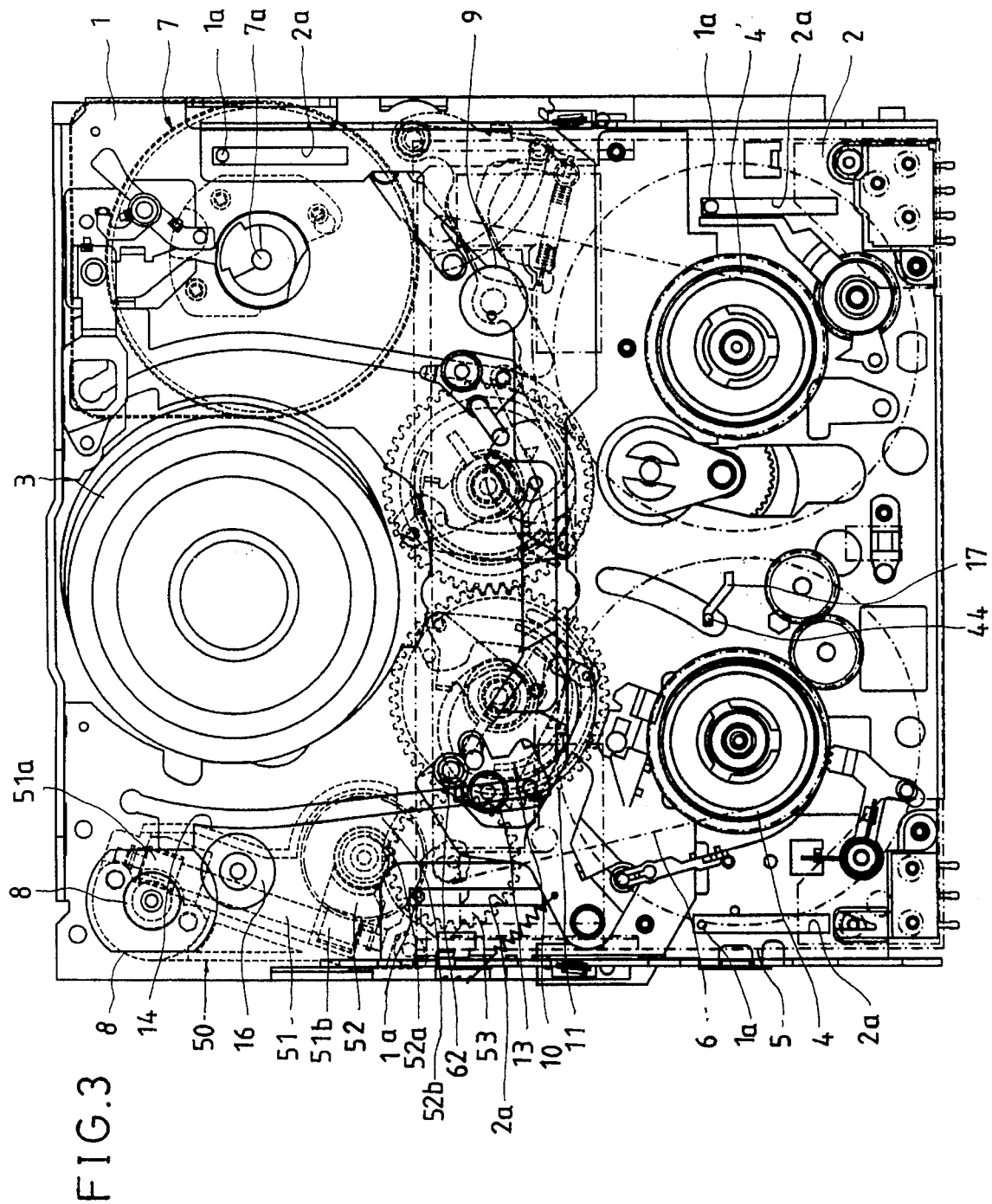
Figure 4:
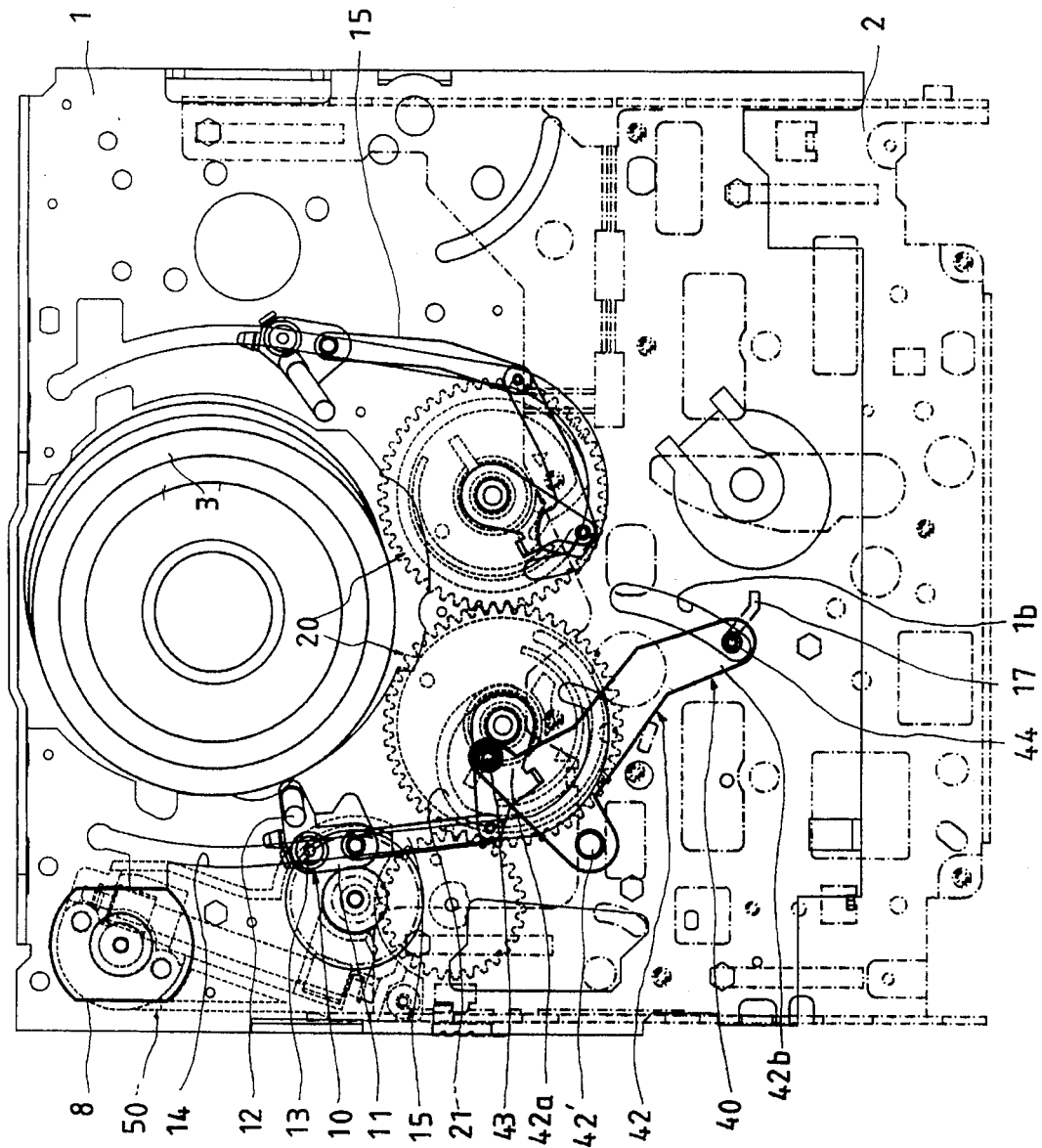

In accordance with an embodiment of the present invention, the reciprocating combination of the slide base 2 with the stationary base plate 1 is achieved by a pin holding technique as shown in FIGS. 3 and 4. That is, the stationary base plate 1 is provided with a plurality of guide pins 1a while the slide base 2 is provided with guide slits 2a which receive the guide pins 1a, thereby achieving the reciprocating combination of the slide base 2 with the stationary base plate 1.

Figure 1:
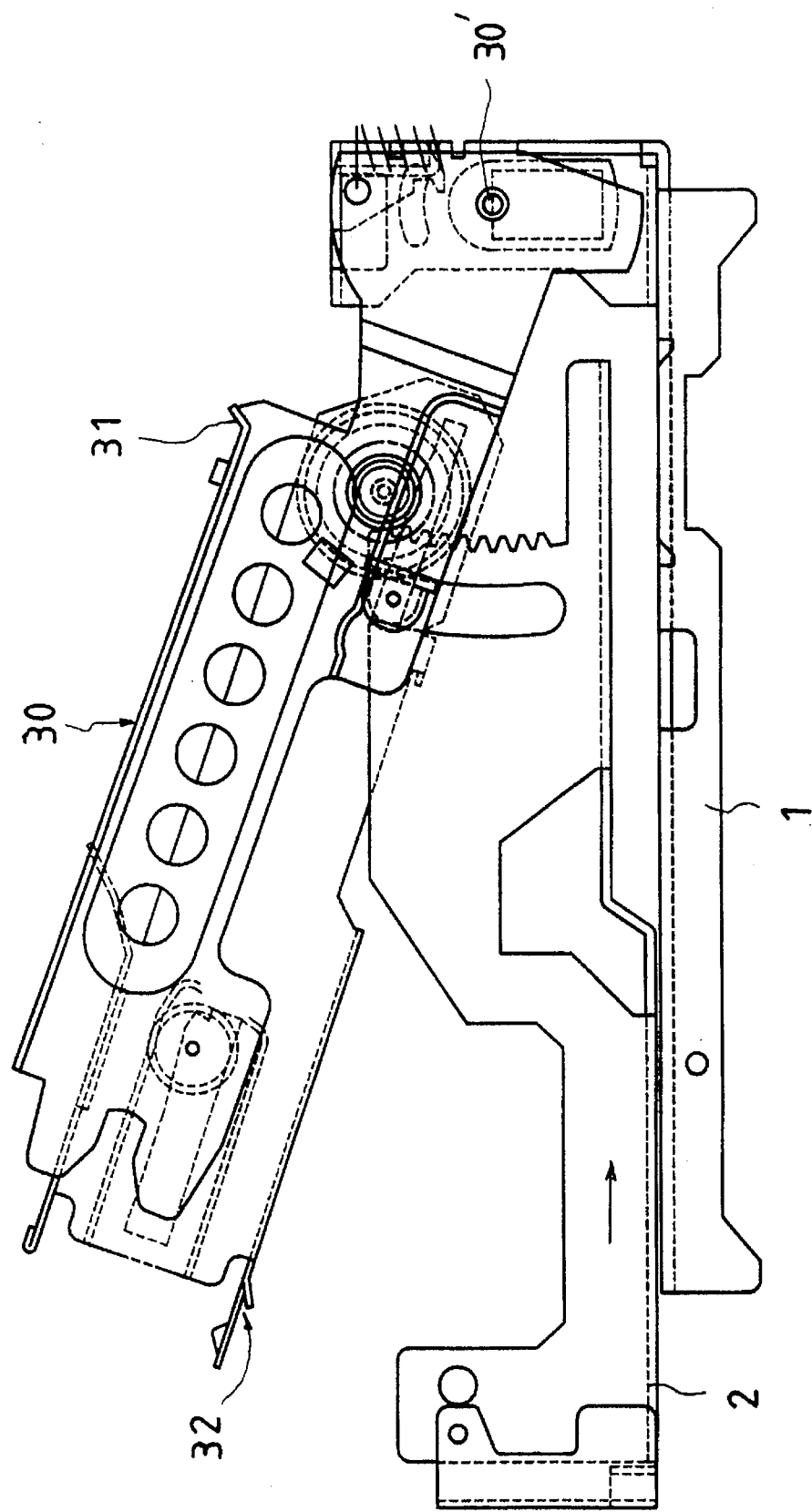
Figure 2:
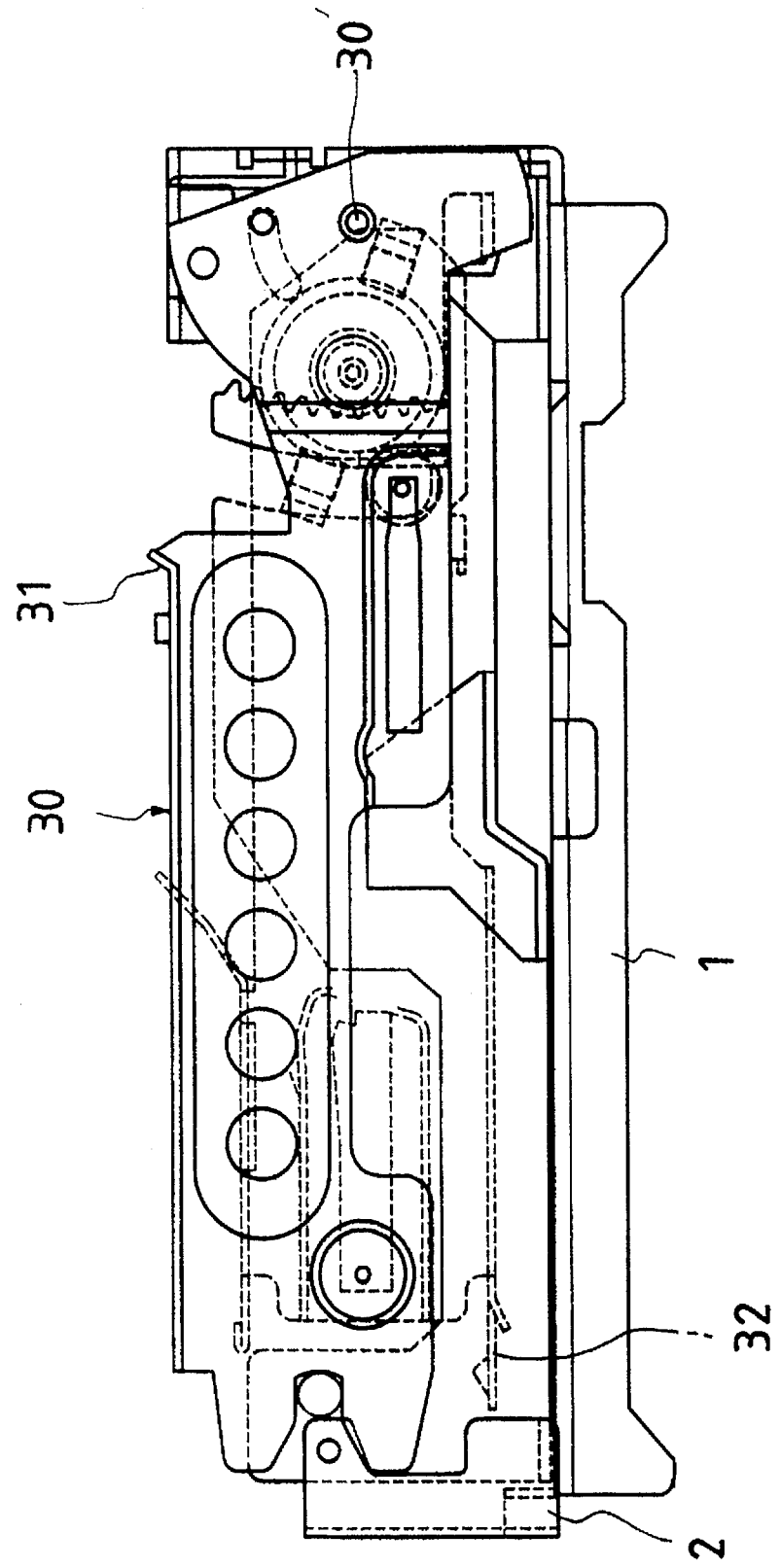

As shown in FIGS. 1 and 2, an operable cassette housing 30 is hinged to a side of the stationary base plate 1 such that it turns about a hinge shaft 30'. The operable cassette housing 30 comprises an operable bracket 31, which is hinged to the side of the stationary base plate 1 such that it turns about the hinge shaft 30' to open or close the housing 30, and a cassette holder 32 which is mounted on the operable bracket 31 such that it moves linearly with respect to the operable bracket 31.

As best seen in FIGS. 3 and 4, a rotary head drum 3 is slantingly mounted on the stationary base plate 1 while a tape supply reel table 4 and a tape take-up reel table 4' are mounted on the slide base 2. On the stationary base plate 1 and the slide base 2, varieties of function elements are arranged between the rotary head drum 3 and the pair of reel tables 4 and 4'. The function elements draw, in combination with each other, the tape 6 out of the tape cassette 5 loaded on the pair of reel tables 4 and 4' of the slide base 2 and make the tape 6 run in a predetermined running path, and control the varieties of functions of the deck mechanism, The above function elements are a capstan motor 7, a pinch roller 9 which come into rotatable and tight contact with an output shaft 7a of the capstan motor 7 and feeds the tape 6 out of the tape cassette 5 by imparting a frictional force to the tape 6. In addition, a slant post 12 and a guide roller 13 of the function elements are arranged at opposite sides of the rotary head drum 3 to guide the running tape 6. The function elements further include a stabilizer 16 stabilizing the tape running state, and a tension control post 62 allowing the tape 6 to have a constant tensile force during its running.

On the stationary base plate 1 at opposite sides of the rotary head drum 3, a pair of loading guide slits 14 are formed as best seen in FIG. 4. Each of the pair of loading guide slits 14 receives a slant post base 11 such that the slant post base 11 moves frontwards and backwards along the slit 14.

Each of the slant post bases 11 supports one of the slant posts 12 and one of the guide rollers 13 and constitutes, in combination with the slant post 12 and the guide roller 13 supported thereby, a slant post assembly 10. Thus, the slant post base 11 moves along with the slant post 12 and the guide roller 13.

Under the stationary base plate 1, a pair of loading gears 20 are mounted on individual shafts such that they are arranged at the front of the rotary head drum 3 and engage with each other. The pair of loading gears 20 are adapted for reciprocating the slant post assemblies 10 as well as the slide base 2 frontwards and backwards, and rotated upon reception of the rotational force of a loading motor 8 through a power transmission gear train 50.

In order to transmit the rotational force of the loading motor 8 to the pair of loading gears 20 through the gear train 50, the loading motor 8 is mounted on an upper side of the stationary base plate 1 such that it protrudes from the base plate 1. A gear shaft 51 comprising a first worm 51a and a second worm 51b is mounted on a lower surface of the stationary base plate 1. Here, the first worm 51a of the gear shaft 51 engages with a drive gear 5' protruding from the lower surface of the stationary base plate 1 while the second worm 51b engages with a two-stepped intermediate gear 52. A power transmission gear 53 is arranged between the two-stepped gear 52 and one of the loading gears 20 such that it engages with them.

Thanking for the aforementioned gearing arrangement, the loading gears 20 are rotated by the rotational force of the loading motor 8.

As best seen in FIG. 4, a loading lever 15 comprising a plurality of link levers is connect, ed at. an end thereof to an upper surface of each of the loading gears 20 and at, the other end thereof to a lower surface of the slant post base 11 of each of the slant post assemblies 10. Hence, the rotation of the loading gears causes the loading levers 15 to cooperate with individual loading gears 20 to move the slant posts assemblies 10 frontwards or backwards. Here, the loading lever 15 comprises the plurality of link levers connected to each of her through link connections.

Between one of the pair of loading gears 20, the gears 20 being connected to the pair of slant post assemblies 10 through individual loading levers 15 respectively, and the slide base 2, a slide base driving power transmission unit, 40 is arranged and connected thereto as shown in FIGS. 3 and 4. The power transmission unit 40 linearly reciprocates the slide base 2 using the rotational force of the loading gears 20, thereby causing the slant post assemblies 10 as well as the slide base 2 to be driven by the rotational force of the loading gears 20.

In accordance with the embodiment of the present, invention, in order to provide the slide base driving power transmission unit 40 (hereinafter, referred to simply as "the slide base power unit"), the one of the loading gears 20, that is, the left-side loading gear 20 of FIG. 4, is provided at its lower surface with a cam slot 21 while a slide base moving cam lever 42 is rotatably mounted on the stationary base plate 1 at a side of the left-side loading gear 20 such that it is rotated about a shaft 42'. The cam lever 42 is provided at an end thereof with a cam pin 43 which is in turn received by the cam slot 21 of the left-side loading gear 20. Thus, the cam lever 42 cooperates with the loading gear 20 and turns about the shaft 42' when the loading gear 20 is rotated. In addition, the slide base 2 is provided at its middle position with a cam hole 17 while a cam pin 44 fixed to the other end of the cam lever 42 is inserted into the cam hole 17 through an arcuate guide slit 1b of the stationary base plate 1. Thus, the slide base 2 cooperates with the cam lever 42 such that it moves frontwards or backwards when the cam lever 42 is turned about the shaft 42' as a result of the rotation of the loading gear 20.

Figure 6:
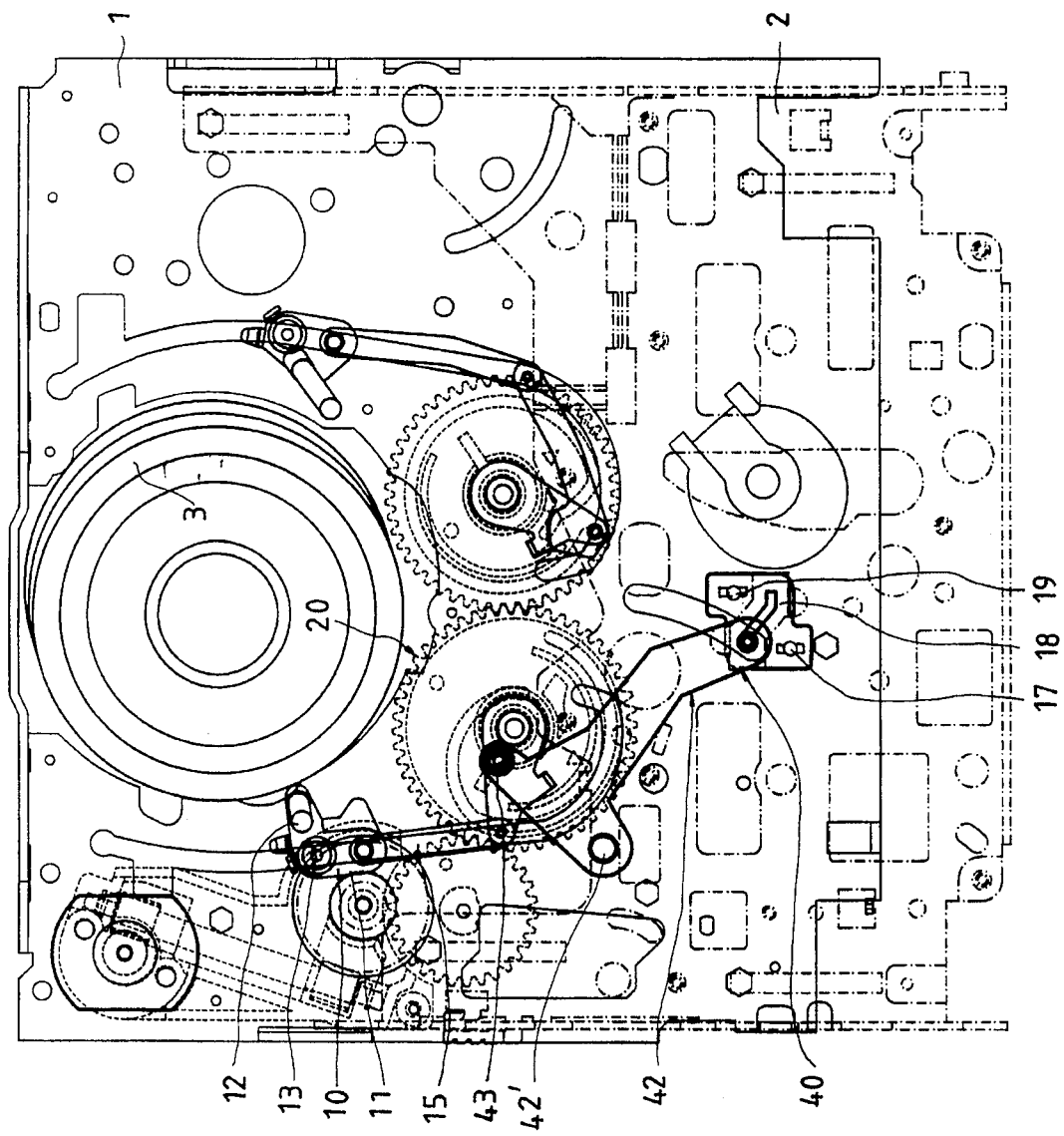

FIG. 6 shows in a plan view an auxiliary control cam adapted for controlling the fixed position of the slide base 2 in accordance with another embodiment of the present invention and mounted on the slide base 2. The cam hole 17 of the slide base 2 may be integrally formed on the slide base 2 as shown in FIG. 3. However, in accordance with another embodiment of the present invention shown in FIG. 6, an auxiliary position controlling piece 18 having the cam hole 17 may be mounted on the slide base 2 such that its mounting position can be adjusted. In order to make it possible to adjust the position of the piece 18 with respect to the slide base 2, the controlling piece 18 may be provided with a pair of slits 19. Through the slits 19, individual set screws are inserted and detachably screw the piece 18 to the slide base 2 such that the mounting position of the piece 18 with respect to the slide base 2 is adjusted as required.

Hereinbelow, the operational effect of the above tape running system with be described.

In order to operate the tape cassette using the above tape running system, the tape cassette 5 is inserted into the cassette holder 32 of the opened cassette housing 30 in the cassette eject mode as shown in FIGS. 1 and 3. The cassette housing 30 is, thereafter, pushed downwards, so that the cassette housing 30 turns counterclockwise about the shaft 30' in the same manner as the conventional camcorder until it recovers its horizontal position. Upon recovery of the horizontal position of the cassette housing 30, the openable bracket 31 is locked to a side wall of the stationary base plate 1 by auxiliary locking means (not shown) and makes the cassette housing 30 be maintained at the horizontal position. At this time, an auxiliary sensing switch (not shown) senses that the normal insertion of the tape cassette 5 in the cassette housing 30 is achieved.

When the switch senses the normal insertion of the tape cassette 5, the loading motor 8 starts to be rotated and its rotational force outputted from its output shaft is transmitted to the pair of loading gears 20 through the gear train 50. Upon reception of the rotational force of the loading motor 8, the pair of loading gears 20 engaging with each other are rotated and this makes the loading levers 15 connected to individual loading gears 20 be driven. Thus, each of the loading levers 15 moves the corresponding slant post assembly 10 along the loading guide slit 14 from the front end to the rear end of the slit 14. Here, the cam pin 43 of the one end 42a of the cam lever 42 is received by the cam slot 21 of the left-side loading gear 20 while the cam pin 44 of the other end 42b of the cam lever 42 is inserted in the cam hole 17 of the slide base 2 as described above. Thus, at the same time of the backward movement of the slant post assemblies 10 by the rotation of the loading gears 20, the cam lever 42 connected to the left-side loading gear 20 through the cam slot 21 and the cam pin 43 turns counterclockwise about the shaft 42' as shown at the arrow A of FIG. 4. The slide base 2 thus moves backwards.

Here, since the cassette holder 32 cooperates with the slide base 2 such that it moves along with the slide base 2, the backward movement of the slide base 2 causes the backward movement of the cassette holder 32 loaded with the tape cassette 5.

Figure 5:
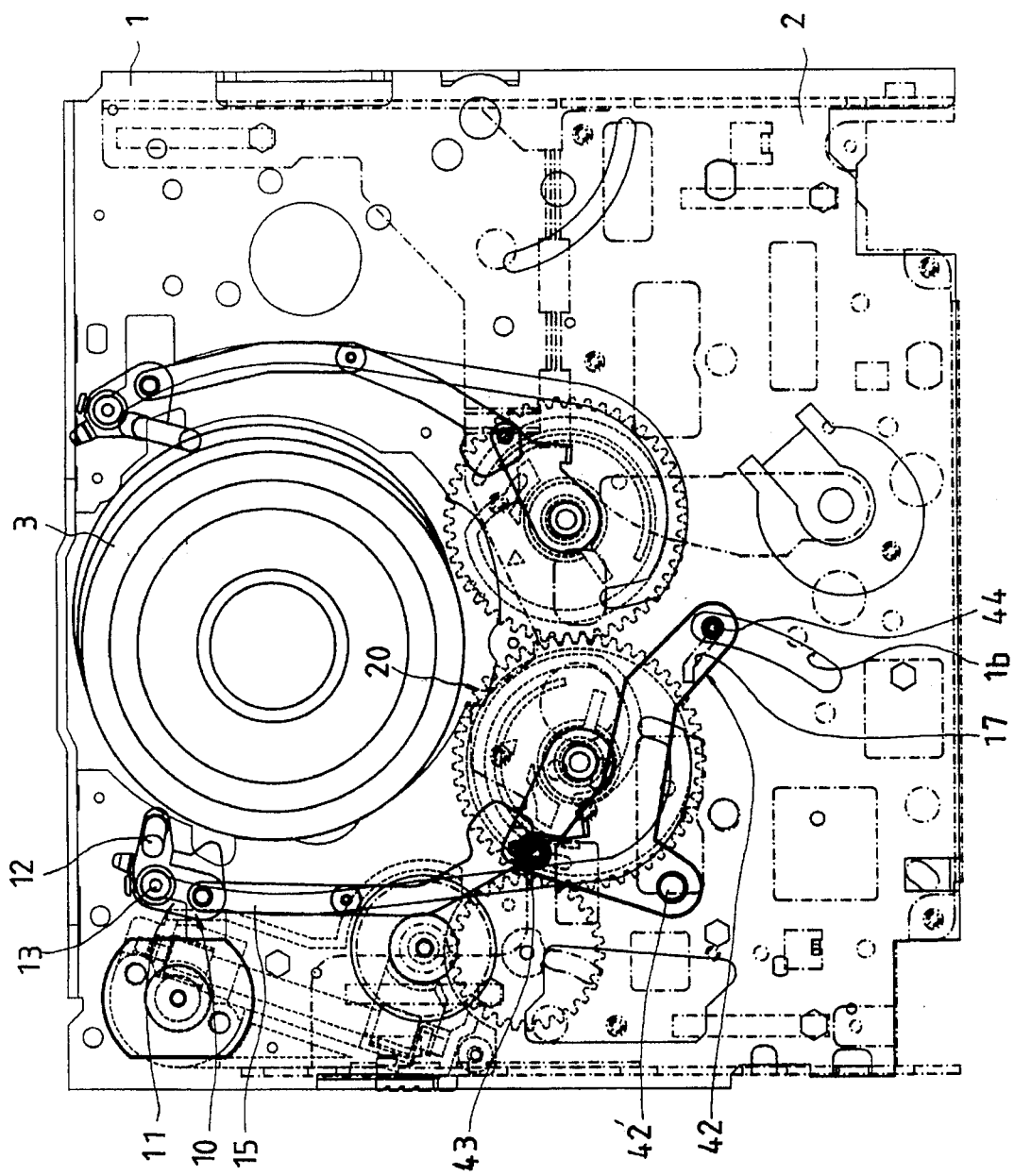

When the desired loading state of the tape cassette 5 is achieved by the backward movement of the tape cassette 5 by a predetermined distance, the tape loading operation is carried out and achieves the tape loading end state shown in FIGS. 2 and 5.

When all of the tape loading operation, the slide base moving operation and the tape loading operation are finished as shown in FIG. 5, a desired tape running mode, such as the playback mode, is carried out. On the other hand, in order to remove the tape cassette 5 from the deck mechanism, the aforementioned process is reversely repeated.

Figure 8:
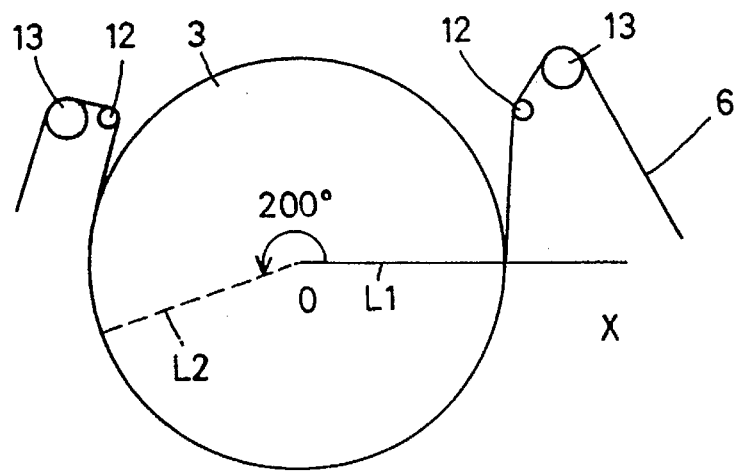
Figure 9:
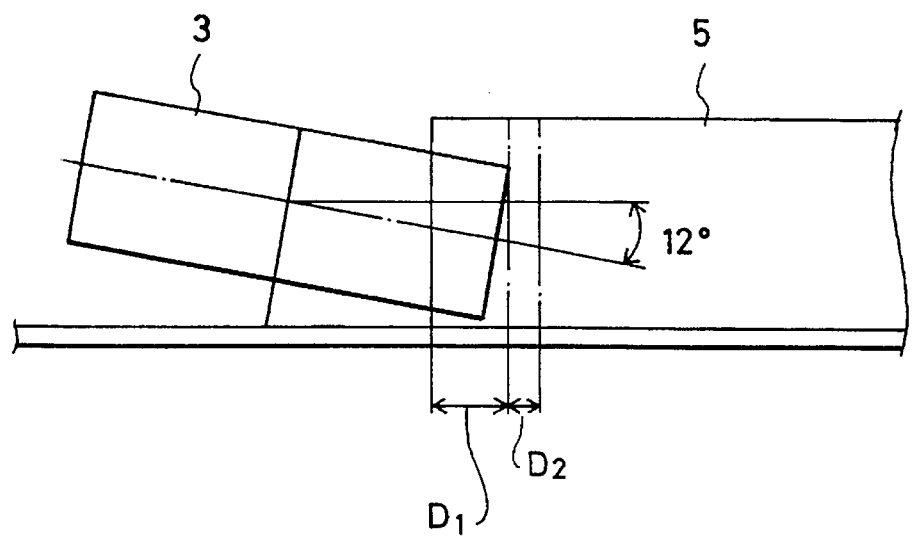
FIG. 9 is a schematic side view of the rotary head drum and showing an inclination angle of the rotary head drum and an overlapped distance of the rotary head drum with the tape cassette.
Figure 8:
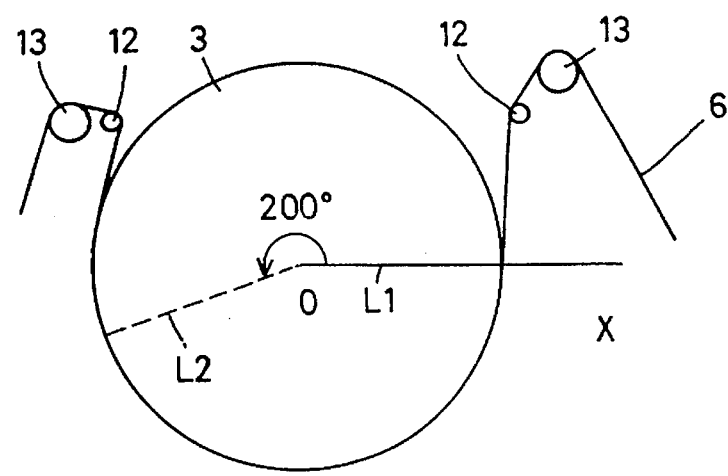
Figure 9:
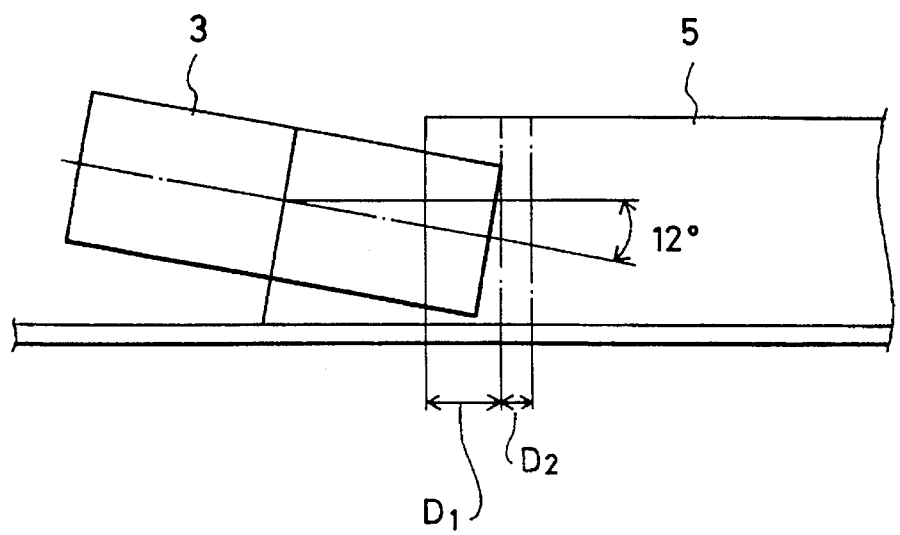

Particularly, as best seen in FIG. 7 the rotary head drum 3 is arranged on the deck mechanism such that it is inclined in a predetermined direction with respect to the vertical axis of the deck mechanism so as to helically scan the tape 6. If described in detail, as shown in FIGS. 8 and 9, the rotary head drum 3 is downwardly inclined at an inclination angle of 12° with respect to an inclination reference line $L_2$, which is located at a position rotated at an angle of 200° in the counterclockwise direction from the horizontal reference line $L_1$ orienting to the X direction from the rotational center 0 of the rotary head drum 3.

In addition, the lapping angle of the tape 6 with respect to the rotary head drum 3 is set to 193°. When letting the slant post 12 disposed at the tape input side of the rotary head drum 3 be an input slant post and letting the slant post 12 disposed at the tape output side of the rotary head drum 3 be an output slant post, the lapping angle of the tape 6 with respect to the input slant post 12 is set to 85.37° while the lapping angle of the tape 6 with respect to the output slant post 12 is set to 25.5°.

Of the tape lapping angle 193° of the rotary head drum 3, only an angle of 183° is used for recording or playing back video signals to or from the tape 6 and for an index signal processing. That is, an overlapped angle of 10° at both the tape input side and the tape output side of the head drum 3 is useless while an angle of 180° is used for recording and playing back the video signals and an angle of 3° is used for the index signal processing.

As described above, the inclination direction and the inclination angle of the rotary head drum 3 are set to 200° and 12°, respectively. In this regard, when the tape cassette 5 is loaded to the rotary head drum 3, the overlapping distance $D_1$ of the tape cassette 5 with the head drum 3 is increased to at least 10 mm, thereby reducing the Y-directional length of the deck mechanism.

In addition, since the lapping angle of the tape 6 with respect to the output slant post 12 is set to 25.5° while maintaining the inclination direction and the inclination angle of the rotary head drum 3 as described above, the frictional load imparted to the output slant post 12 is substantially reduced. Hence, the load imparted to the capstan shaft 7a is minimized, thereby reducing the running load of the tape 6 and achieving the desirable smooth running of the tape 6.

Figure 10:
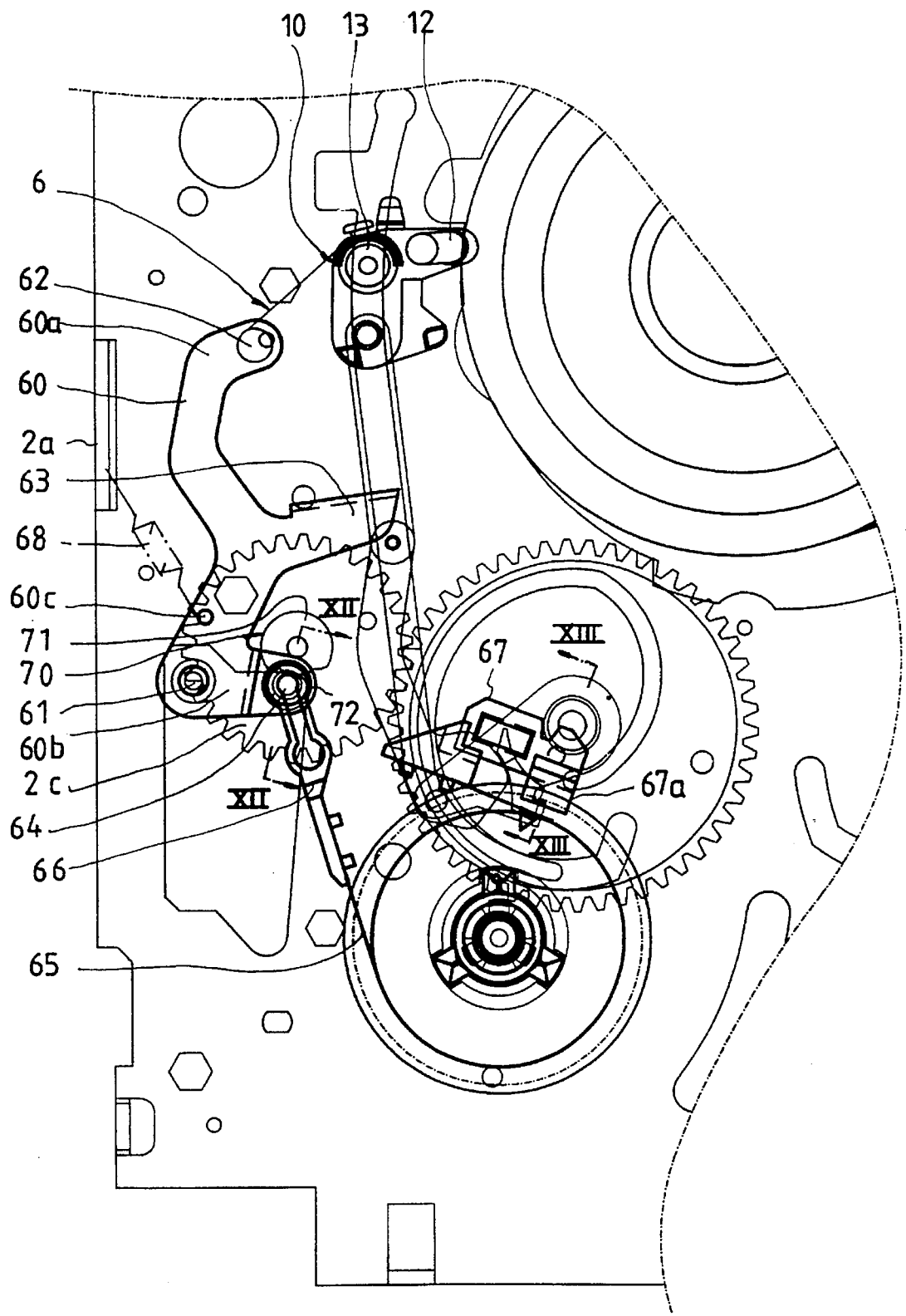
FIGS. 10 and 11 are partial plan views of a tension control unit of the tape running system in accordance with the present invention in the playback mode and in the stop mode, respectively.
Figure 11:
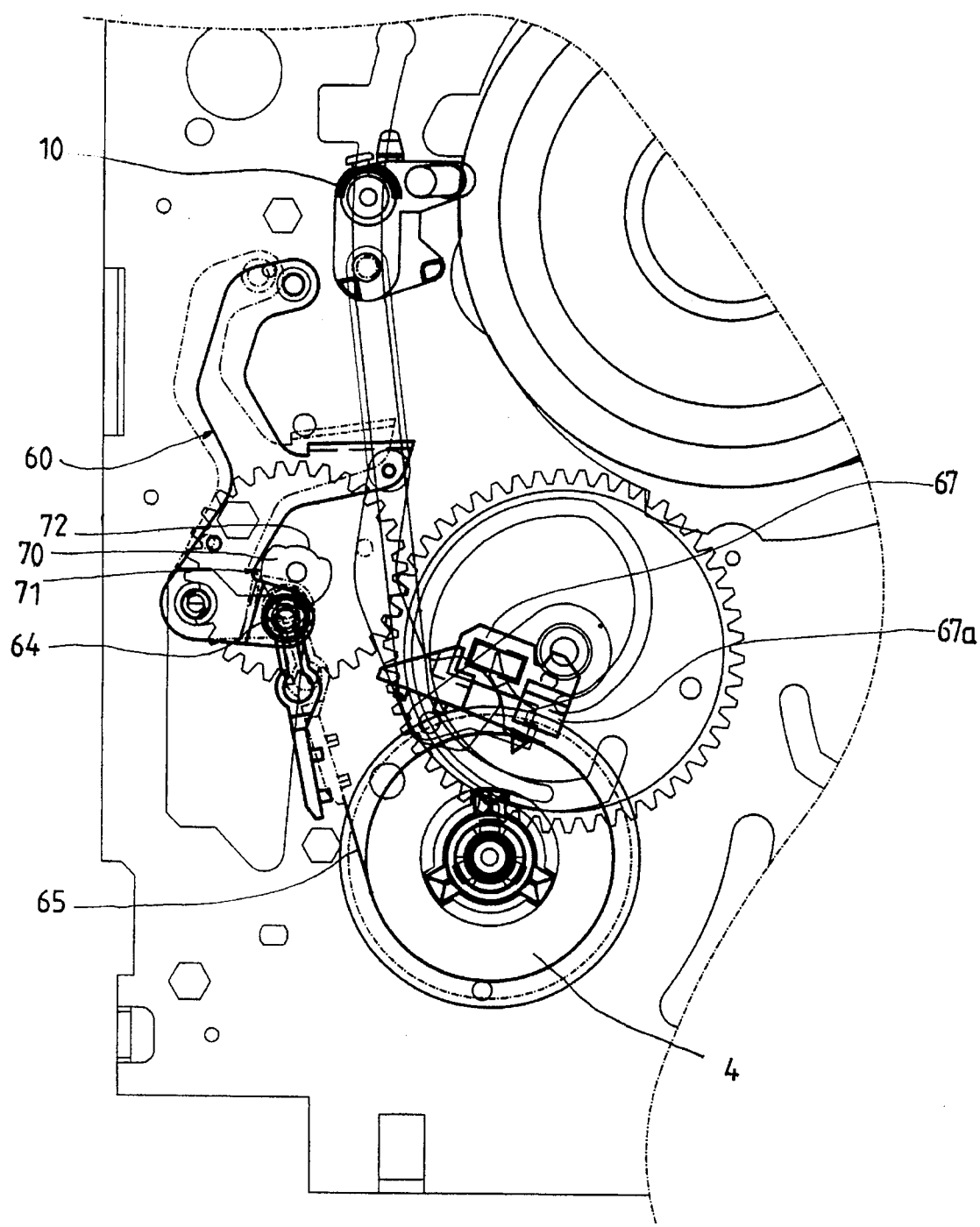
Figure 12:
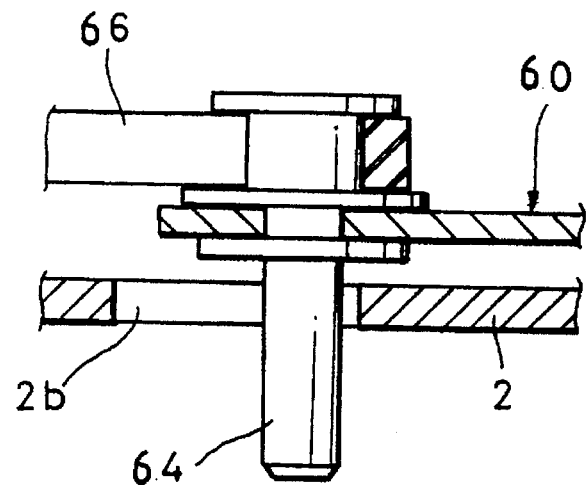
FIG. 12 is a sectional view of the tension control unit taken along the section line XII—XII of FIG. 10.
Figure 13:
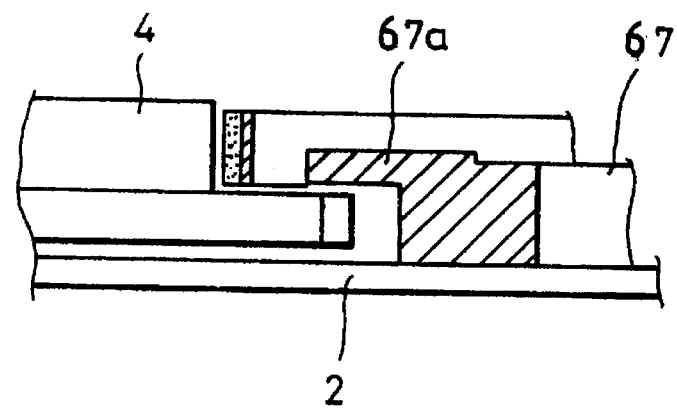
FIG. 13 is a sectional view of the tension control unit taken along the section line XIII—XIII of FIG. 10.

FIGS. 10 and 11 are partial plan views of the tension control unit of the tape running system in accordance with the present invention in the playback mode and in the stop mode, respectively. FIGS. 12 and 13 are enlarged sectional views of the tension control unit, respectively. As shown in these drawings, a tension arm 60 is mounted on the slide base 2 such that it is rotated about a shaft 61. The tension arm 60 is provided at an end 60a thereof with a tension post 62, and at the middle portion thereof with a contact protrusion 63 which comes into contact with the slant post base 11 of the slant post assembly 10. The tension arm 60 is also provided at the other end 60b thereof with an operating pin 64.

The operating pin 64 of the tension arm 60 is connected at its upper end to an end of a tension band 65 through a connection piece 66. The tension band 65 is lapped about a part of the circumferential periphery of the tape supply reel table 4 and connected at the other end thereof to a stationary pin 67 which is mounted on the slide base 2 such that it is adjustable in its position.

At a side of the stationary pin 67, a support member 67a is provided so as to prevent the upward separation of the tape supply reel table 4 as shown in FIGS. 10 and 13.

The tension arm 60 further includes a fixing hole 80c to which an end of a spring member 88 is connected so as always bias the tension arm 60 counterclockwise about the shaft 61. The spring member 68 is also connected at the other end thereof to a fixing member 2a provided at the side wall of the slide base 2. The contact protrusion 63 of the tension arm 60 comes into contact with the base 11 of the slant post assembly 10 due to for the restoring force of the spring member 68 as best seen in FIG. 3.

In operation of the above tension control unit, when the left-side loading gear 20 is rotated clockwise by the rotational force of the loading motor 8 under the condition that the eject mode of FIG. 1 is changed into the playback mode, the slant post assembly 10 moves backwards along the loading guide slit 14. At this time, since the contact protrusion 63 of the tension arm 60 comes into elastic contact with the base 11 of the slant post assembly 10, the backward movement of the assembly 10 causes the tension arm 60 to be slowly turned counterclockwise about the shaft 61. When the slant post assembly 10 as well as the tension arm 60 shifted to the loading end position as shown in FIG. 5, a tape running mode, such as the playback mode, is performed. When the tape 6 is imparted with an excessive tensile force in the case of such a tape running mode, the biasing force imparted to the tension post 62 by the tape 6 is increased. Thus, the tension arm 60 is turned clockwise about the shaft 61 such that it loosens the tension band 65 lapped about the tape supply reel table 4. This makes the resistant force against the tape supply operation carried out by the tape supply reel table 4 to be substantially reduced, thereby reducing the tensile force imparted to the tape 6.

Additionally, the tension control unit controls the tensile force of the tape 6 in the case of a lower tensile force imparted to the tape 6. Otherwise stated, when the lower tensile force is imparted to the tape 6, the biasing force imparted to the tension post 62 by the tape 6 is decreased. The tension arm 60 is thus turned counterclockwise about the shaft 61 such that it tightens the tension band 65 lapped about the tape supply reel table 4. This makes the resistant force against the tape supply operation carried out by the tape supply reel table 4 to be increased, thereby increasing the tensile force imparted to the tape 6.

As described above, the tension post 62 of the tension control unit varies in its position in accordance with the tensile force level of the tape 6 and controls the rotational force of the tape supply reel table 4, thereby making the tensile force of the tape 6 be constantly maintained at a predetermined level.

The slide base 2 further includes an arcuate guide hole 2c into which the operating pin 64 fixed to the other end 61b of the tension arm 60 is inserted to protrude downwards addition, the power transmission gear 53 is provided at its upper surface with an operating cam 70 which receives the operating pin 64 of the tension arm 60 and turns the tension arm 60 by operating the pin 64 at the same time of its rotation. The operating cam 70 comprises a larger diameter section 71 and a smaller diameter section 72.

When the tape running mode, such as the playback mode shown in FIG. 10, is changed into the stop mode wherein the tape running operation is stopped, the loading motor 8 slightly rotated in the reversed direction at the state of the tape running mode of FIG. 10. The reversed rotation of the loading motor 8 makes the power transmission gear 53 be slightly rotated clockwise, thereby causing the operating cam 70 of the transmission gear 53 to be rotated in the clockwise direction along with the transmission gear 53. Hence, the operating pin 64 of the tension arm 60 is displaced from a position, wherein it is located in the smaller diameter section 72 of the operating cam 64 of the power transmission gear 53 and freely controls the tensile force of the tape without interference with the operating cam 64 as shown at the solid line of FIGS. 10 and 14, to another position wherein comes into contact with the larger diameter section 71 of the operating cam 64 as shown at the dotted line of FIG. 14. The tension arm 60 is thus rotated counterclockwise to loosen the tape 6, thereby slightly reducing the tensile force imparted to the tape 6.

Figure 14:
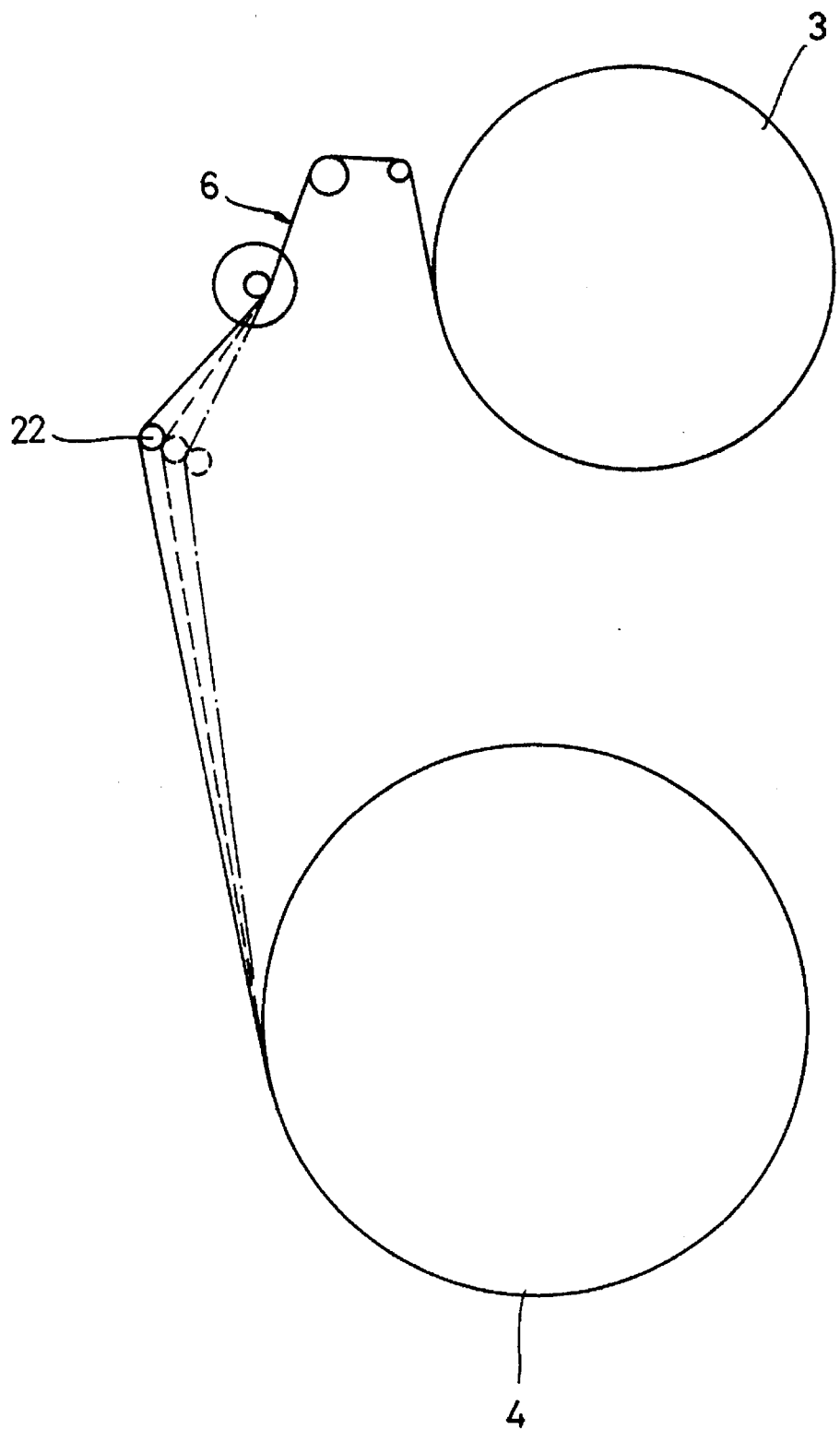
FIG. 14 is a schematic view showing the operation of the tension control unit of the present invention.

On the other hand, when a review mode wherein the tape 6 is run in the reversed direction is carried out, the tensile force imparted to the tape 6 is increased such that it is higher than that of the playback mode. The biasing force imparted to the tension post 62 of the tension arm 60 is thus increased, so that the tension arm 60 is slightly turned clockwise. Therefore, the tension post 62 as well as the tape 6 located at the playback mode position shown at the solid line of FIG. 14 is changed into the position shown at the dotted line of FIG. 14 which is moved inwardly from the playback mode position. At this state, the review mode is performed. In the conventional manner, when the review mode is changed into the playback mode, the tape 6 and the tension post 62 are directly shifted from the dotted line position to the solid line position of FIG. 14. At this time, there may be a problem in that the head drum-side part of the tape 6 instantaneously imparts an excessive force to the rotary head drum 3 and this makes it difficult to start the rotary head drum 3. However, in accordance with the tension control unit of the present invention, the review mode is not directly changed into the playback mode, but temporarily changed into the stop mode such that the tape running is temporarily stopped and, thereafter, changed into the playback mode, thereby overcoming the aforementioned problem.

As described above, the tape running system of the present invention drives a loading lever as well as a slide base using the rotational force of a pair of loading gears. Thus, the present invention reduces the number of the required elements in comparison with the conventional camcorder and simplifies the construction of the tape running system, thereby achieving the recent trend of compactness of the camcorder.

The slide base may be provided with a separated type cam piece, having a cam hole and being adjustable in its mounting position on the slide base, instead of an integrated type cam hole. In this case, when the moving stroke of the slide base is not precisely achieved, the precise moving stroke of the slide base is achieved by simply adjusting the mounting position of the separated type cam piece with respect to the slide base.

In addition, in comparison with the conventional slide loading type magnetic recording and reproducing apparatus, the apparatus having the tape running system of the present invention has a desirable index function and substantially reduces its Y-directional length, resulting in achievement of the recent trend of compactness.

If described in detail, the conventional slide loading type magnetic recording and reproducing apparatus preferably allows the inclination direction of the rotary head drum be 198°, the inclination angle to be 11.5° and the lapping angle of the tape with respect to the rotary head drum to be 190°. The tape scanning distance of the rotary head drum is thus short, thereby causing the conventional apparatus to have no index function.

However in the present invention, the inclination direction and the inclination angle of the rotary head drum and the lapping angle of the tape with respect to the rotary head drum are 200°, 12° and 193°, respectively. In this regard, an angle of 3° of the remaining lapping angle of 183° resulting from subtracting the overlapped angle of 10° at both the tape input side and the tape output side of the head drum from the total lapping angle of 193° is used for index signal processing while the remaining angle of 180° is used for recording and playing back the video signals. Hence, the present invention provides the desirable index function for the slide loading type magnetic recording and reproducing apparatus.

In addition, in comparison with the conventional VCR, using no slide loading technique, wherein the interval $D_2$ between the tape cassette and the rotary head drum is about 3.5 mm, the tape running system of the present invention achieves the compactness of the deck mechanism by reducing the Y-directional length of the deck mechanism by about 13.5 mm.

In the above description, the designing condition for the rotary head drum and the slant post of the present invention has been disclosed for a tape running system suitable for used in a slide loading type magnetic recording and reproducing apparatus having a rotary head drum of a diameter of 40 mm. However, the aforementioned designing condition of the present invention may be adjusted within the range of ±10% accordance with a structure of the deck mechanism and yields the same result as that described for the preferred embodiment without affecting the functioning of this invention.

In accordance with the present invention, the tensile force imparted to the tape when the playback mode is changed into the stop mode is desirably reduced. Thus the present invention completely removes the presence of start trouble of the rotary head drum due to the temporary stop of the rotary head drum when the rotary head drum starts to be rotated in the case of change of the stop mode into the tape running mode, such as the playback mode. In addition, the present invention prevents the start trouble of the rotary head drum caused by the dewed state of the inside of the deck mechanism. Furthermore, the tension control unit of the present invention makes the review mode be indirectly changed into the playback mode with dropping into a temporary stop mode on its mode change, thereby overcoming the unstable start of the rotary head drum, in changing the review mode into the playback mode, caused by variation of the tensile force of the tape.

The tape running system of the present invention is particularly efficiently adapted to a compact product, such as a slide loading type 8 mm camcorder.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

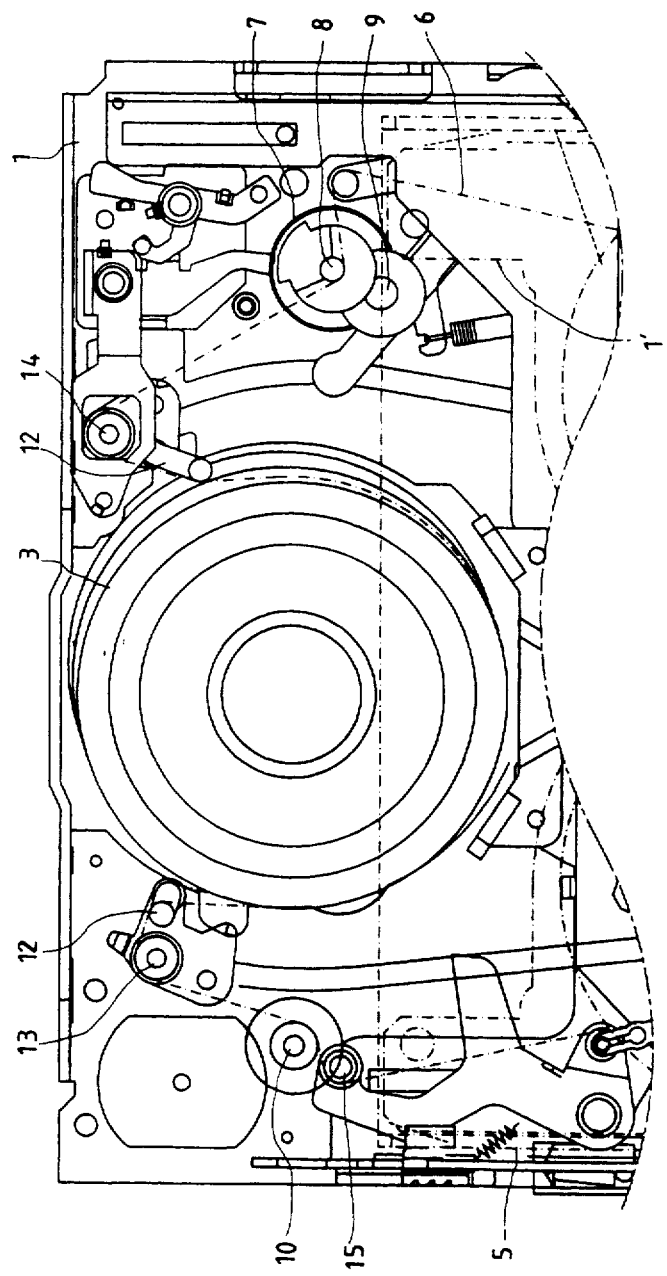

What is claimed is:

1. A tape running system for a magnetic recording and reproducing apparatus comprising:

a stationary base plate mounted on a main body of said apparatus;

a slide base mounted on said stationary base plate such that said slide base is reciprocatable with respect to said stationary base plate within a predetermined range;

a pair of loading gears mounted on a surface of said stationary base plate and engaging with each other, each of said pair of loading gears being directly connected to a pair of respective individual loading levers which are directly connected to a respective pair of slant post assemblies; and means for transmitting a rotational force of said loading gears to said slide base for driving said slide base, said rotational force transmitting means being connected between one of said pair of loading gears and said slide base and linearly reciprocating said slide base using said rotational force of the loading gears;

whereby said pair of slant post assemblies as well as said slide base are concurrently driven by said rotational force of said loading gears and said slide base reciprocates to receive a tape carrying medium.

2. A tape running system for a magnetic recording and reproducing apparatus according to claim 1, wherein said rotational force transmitting means comprises:

a cam lever rotatably mounted on said stationary base plate at a side of one of said pair of loading gears such that it is rotated about a shaft, said cam lever being provided at one end thereof with a first cam pin and at another end thereof with a second cam pin;

a cam slot provided at a lower surface of said one of the loading gears and receiving said first cam pin of said cam lever; and a cam hole provided at a middle portion of said slide base and receiving said second cam pin of said cam lever.

3. A tape running system for a magnetic recording and reproducing apparatus according to claim 2, wherein said cam hole of the slide base is provided in a position controlling piece, said piece being mounted on said slide base such that its mounting position is adjusted.

4. A tape running system for a magnetic recording and reproducing apparatus according to claim 1, wherein said pair of slant post assemblies and said slide base are concurrently driven to move in a substantially same direction.

5. A tape running system for a magnetic recording and reproducing apparatus comprising:

a stationary base plate mounted on a main body of said apparatus;

a slide base mounted on said stationary base plate such that said slide base is reciprocatable with respect to said stationary base plate within a predetermined range;

a pair of slant post assemblies disposed in a pair of guide slits in said stationary base and movable between a tape unloaded position and a tape loaded position;

a pair of loading gears mounted on a surface of said stationary base plate and engaging with each other, said pair of loading gears being directly connected to a pair of respective individual loading levers which are directly connected to said pair of slant post assemblies, said individual loading levers being folded in a position above said loading gears when said slant post assemblies are in a tape unloaded position, within a periphery of said pair of loading gears; and means for transmitting a rotational force of said loading gears to said slide base for driving said slide base, said rotational force transmitting means being connected between one of said pair of loading gears and said slide base and linearly reciprocating said slide base using said rotational force of the loading gears;

whereby said pair of slant post assemblies as well as said slide base are concurrently driven by said rotational force of said loading gears and said slide base reciprocates to receive a tape carrying medium.

6. The tape running system for a magnetic recording and reproducing apparatus according to claim 5, wherein said rotational force transmitting means comprises:

a cam lever rotatably mounted on said stationary base plate at a side of one of said pair of loading gears such that it is rotated about a shaft, said cam lever being provided at one end thereof with a first cam pin and at another end thereof with a second cam pin;

a cam slot provided at a lower surface of said one of the loading gears and receiving said first cam pin of said cam lever; and a cam hole provided at a middle portion of said slide base and receiving said second cam pin of said cam lever.

7. A tape running system for a magnetic recording and reproducing apparatus according to claim 6, wherein said cam hole of the slide base is provided in a position controlling piece, said piece being mounted on said slide base such that its mounting position is adjusted.

8. A tape running system for a magnetic recording reproducing apparatus according to claim 5, wherein said pair of slant post assemblies and said slide base are concurrently driven to move in a substantially same direction.

* * * * *

UNITED STATES PATENT AND TRADEMARK OFFICE
CERTIFICATE OF CORRECTION

PATENT NO. : 5,608,589
DATED : March 4, 1997
INVENTOR(S) : Myung G. Kang, et al

It is certified that error appears in the above-indentified patent and that said Letters Patent is hereby corrected as shown below:

The drawing sheet 7 of 12, should be deleted to be replaced with the drawing sheet, consisting of Fig. 7, as shown on the attached page.

Signed and Sealed this

Twenty-fifth Day of November, 1997

Attest:

BRUCE LEHMAN

Attesting Officer

Commissioner of Patents and Trademarks